United States Patent [19]
Mentink

[11] Patent Number: 5,857,381
[45] Date of Patent: Jan. 12, 1999

[54] HYDRAULIC OPERATING DEVICE AND GEARBOX PROVIDED WITH SUCH AN OPERATING DEVICE

[75] Inventor: Laurentius A. G. Mentink, Haaksbergen, Netherlands

[73] Assignee: Applied Power Inc., Butler, Wis.

[21] Appl. No.: 827,978

[22] Filed: Apr. 11, 1997

Related U.S. Application Data

[63] Continuation of PCT/NL95/00349, Oct. 12, 1995, published as WO96/12108, Apr. 25, 1996.

[30] Foreign Application Priority Data

Oct. 13, 1994 [NL] Netherlands ............................ 9401692

[51] Int. Cl.$^6$ .................................................. F16H 59/04
[52] U.S. Cl. .............................. 74/335; 74/364; 60/468; 60/476
[58] Field of Search ......................... 74/335, 471, 473.11, 74/364; 192/86; 92/166; 60/475, 468, 476

[56] References Cited

U.S. PATENT DOCUMENTS

| | | | |
|---|---|---|---|
| 3,425,293 | 2/1969 | Krawczyk et al. .................... | 74/364 X |
| 3,593,522 | 7/1971 | Angert et al. ................................ | 60/53 |
| 3,672,167 | 6/1972 | Griesenbrock ......................... | 60/468 X |
| 5,444,979 | 8/1995 | Funami et al. ......................... | 60/476 X |
| 5,697,251 | 12/1997 | Lorriette et al. ........................... | 74/335 |

FOREIGN PATENT DOCUMENTS

| | | |
|---|---|---|
| 0 032 300 | 7/1981 | European Pat. Off. . |
| 0 087 794 | 9/1983 | European Pat. Off. . |
| 0 573 090 | 12/1993 | European Pat. Off. . |
| 487346 | 5/1969 | Switzerland . |

OTHER PUBLICATIONS

Applicant's Exhibit A—Search Report of priority Netherlands Appl. No. 9401692.
Applicant's Exhibit B—English Translation of Exhibit A.
Applicant's Exhibit C—International Search Report for International Appl. No. PCT/NL95/00349, of which the present application is a continuation.
Applicant's Exhibit D—International Preliminary Examination Report for International App. No. PCT/NL95/00349.

*Primary Examiner*—Richard M. Lorence
*Assistant Examiner*—Sherry Lynn Estremsky
*Attorney, Agent, or Firm*—Quarles & Brady

[57] ABSTRACT

Hydraulic operating device, in particular for the operation of a selector fork of a gearbox, and gearbox provided with such an operating device. The device comprises a double-acting cylinder, which is coupled to the selector fork, and a reversible pump. The pump is connected to the working chambers of the cylinder by supply lines. A valve is mounted in each of the supply lines which is operated by fluid flow. This valve comprises a body, a bore formed in the body, a piston, which divides the bore into two chambers, a through-channel, formed in the piston and designed as a flow orifice, connecting the two chambers.

3 Claims, 2 Drawing Sheets

5,857,381

HYDRAULIC OPERATING DEVICE AND GEARBOX PROVIDED WITH SUCH AN OPERATING DEVICE

This is a continuation of International Application PCT/NL95/00349, with an international filing date of Oct. 12, 1995, now abandoned.

BACKGROUND OF THE INVENTION

1. Field of the Invention

The present invention relates to a hydraulic operating device, in particular for the operation of a selector fork of a gearbox, comprising a double-acting cylinder, a pump, and a reservoir for hydraulic fluid.

2. Description of the Related Art

A hydraulic operating device for the operation of a selector fork of a gearbox is known. This known device comprises a single-acting electrically driven pump, the suction port of which is connected to the reservoir and the pressure port is connected, according to choice, via an electrically operated valve to one of the two working chambers of the double-acting cylinder. The working chamber which is not connected to the pump is then connected to the reservoir. The valve has a non-operating position in which both working chambers of the double-acting cylinder are connected to the reservoir.

For the effecting of a fast movement of the selector fork, the pump, which has a high output, is switched on for a short period, whilst at the same moment the valve is operated and this connects the pressure port of the pump to the desired operating chamber. As soon as the pump is switched off, operation of the valve is discontinued such that this valve again takes up its non-operating position. It is important that this device ensures that the double-acting cylinder is now "pressureless", that is that there is no residual pressure remaining in the cylinder which would continue to load the selector fork. This would in practice lead to excessive loading and wear of the synchronizing rings normally present in a gearbox.

The known device has the disadvantage that the use of the electrical valve leads to an undesirably high cost.

BRIEF SUMMARY OF THE INVENTION

The present invention therefore aims to provide a hydraulic operating device of the type mentioned in the preamble, in particular for the operation of a selector fork of a gearbox, in which the electrically operated valve is eliminated.

This objective is achieved by a hydraulic operating device according to the claims.

The requested exclusive right also relates to a gearbox provided with a hydraulic operating device according to the invention.

BRIEF DESCRIPTION OF THE DRAWINGS

The invention will be further clarified in the following on the basis of an exemplary embodiment shown in the drawing of the hydraulic operating device in accordance with the invention. In the drawing.

DETAILED DESCRIPTION OF THE INVENTION

Figure 1:
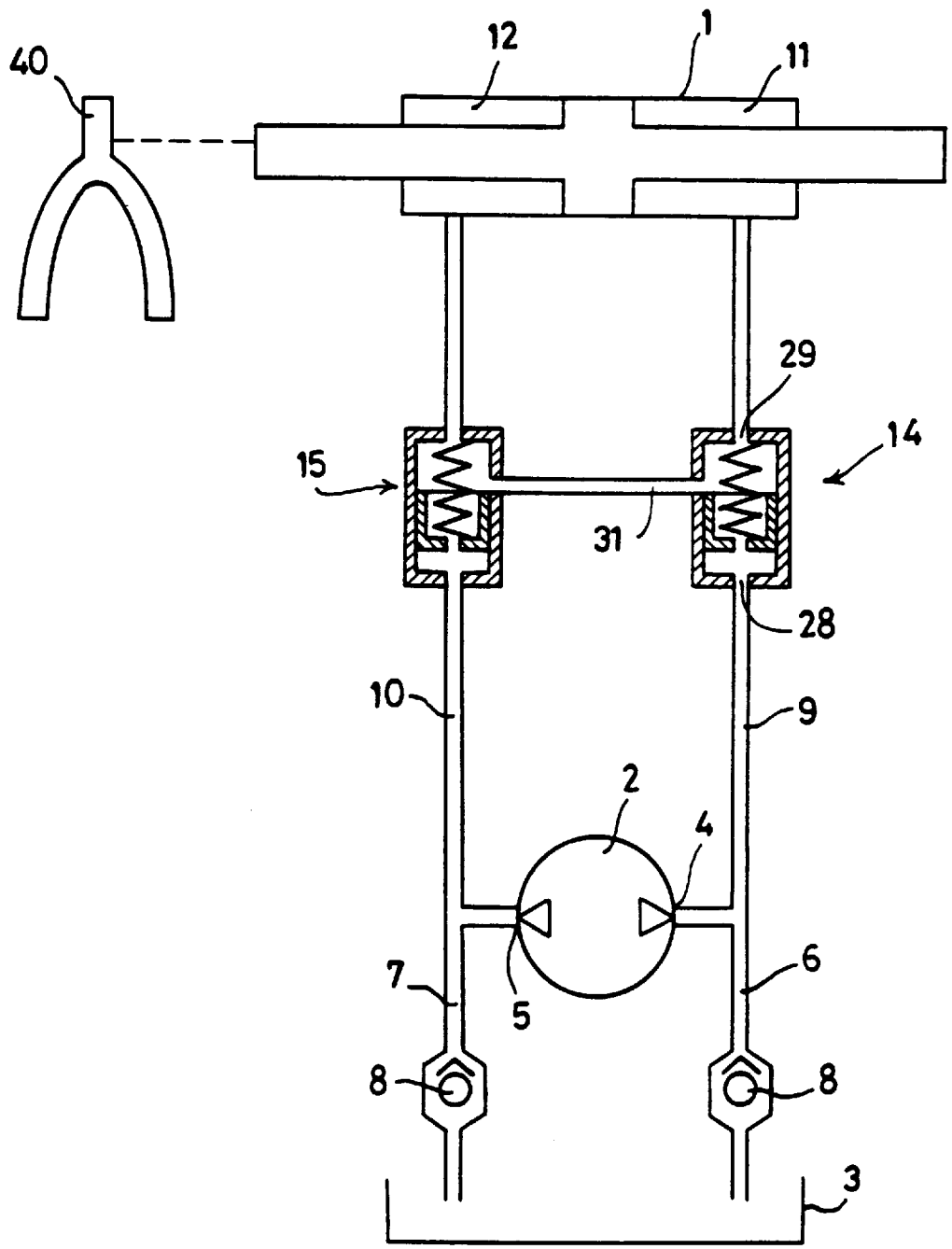
FIG. 1 shows a diagram of the hydraulic operating device in accordance with the invention.

In FIG. 1 a hydraulic operating device for the operation of a selector fork of a gearbox is shown. The device comprises a double-acting cylinder 1, which is connected to a selector fork 40 of a gearbox of a motor vehicle. The device also includes an electrically driven pump 2 with reversible pumping direction and a reservoir 3 for hydraulic oil.

The pump 2 has, as is normal with this type of pump, two ports 4 and 5, which depending on the pumping direction serve as suction port or pressure port. Each of the ports 4 and 5 are on the one hand connected to the reservoir 3 via a reservoir line, 6 and 7 respectively, in which a non-return valve 8, closing in the direction of the reservoir, is mounted. Furthermore, each of the ports 4 and 5 is connected to one of the working chambers 11, 12 of the double-acting cylinder 1 via a supply line 9 and 10, respectively. The working chambers 11 and 12 have identical cross-sections, that is to say that during movement of the piston in the cylinder 1 the volume increase of the one working chamber is equal to the volume ecrease of the other working chamber.

In each of the supply lines 9, 10, a valve 14, 15, respectively, is mounted which can be operated by fluid flow. The valves 14 and 15 are identical and the construction will now be further explained in combination with FIG. 2, in which the valve 14 is shown in more detail.

Figure 2:
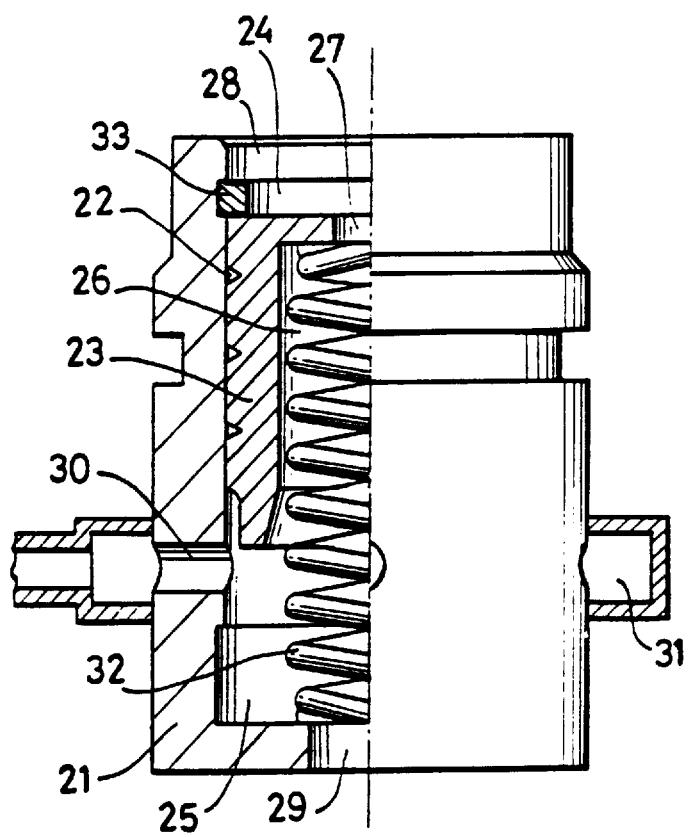
FIG. 2 shows a side view of (left half in section) of a flow-controlled valve from the diagram of FIG. 1.

As can be seen in FIG. 2 valve 14 comprises a metal body 21, in which a cylindrical bore 22 is formed. In the bore 22 there is a piston 23, which fits in the bore 22 with a sliding fit. The bore 22 is divided into two chambers 24 and 25 by the piston 23. These two chambers 24 and 25 are mutually connected by a through-channel 26 formed in the piston 23. The through-channel 26 has on the side of the chamber 24 a section 27 with a smaller passage than the part connected to it, by means of which the section 27 acts as a flow orifice.

The valve 14 further comprises an inlet channel 28 formed in the body 21, which connects the chamber 24 to the port 4 of the pump 2 and that via the through-channel 26 is connected in every position of the piston 23 to a first outlet channel 29 formed in the body 21, which connects the other chamber 25 of the bore 22 to the working chamber 11 of the double-acting cylinder 1. Four radial holes 30 are formed in the body 21 at equal spacing around the circumference of the body 21, which all form part of a second outlet channel 31. Between the body 21 and the piston 23 there is a compression spring 32, which serves as a return spring for the piston 23 and which presses the piston 23 against the ring 33.

In FIG. 1 it can be seen that the second outlet channels 31 of the two valves 14 and 15 are directly connected together.

The functioning of the hydraulic operating device will be explained on the basis of the following example.

To effect a selector movement of the selector fork 40 to the left in FIG. 1, the pump 2 is switched on such that oil is pumped into the working chamber 11. This means that oil is forced from the port 4 to the supply channel 28 of the valve 14 and that a fluid flow is thus created through the through-channel 26 from the side of the inlet channel 28 to the side of the first outlet channel 29. As a result of this, the force generated by the flow orifice 27 will move the piston 23 against the resistance of the return spring 32 from the position shown in FIG. 2 in the direction of the first outlet channel 29 and thus close off the radial holes 30 of the second outlet channel 31.

Through the movement of the piston in the cylinder 1 oil will at the same time be pushed out of the working chamber 12 and as a result will be supplied directly to the port 5, which then serves as suction port. Through the position of the valve 14, there is no oil flow between the two valves 15 and 14.

As soon as the selector movement is completed the pump 2 is stopped. This means that the fluid flow from the inlet channel 28 to the first outlet channel 29 stops abruptly. As a result the return spring 32 will return the piston 23 to its position shown in FIG. 2 and the piston 23 will thus move clear of the holes 30 of the second outlet channel 31. This means that both working chambers 11 and 12 are now connected together via valves 14 and 15, as a result of which a pressure equalization will immediately occur. The piston in the cylinder 1 and with it the selector fork 40 is then unloaded which prevents wear of the gearbox.

From the drawing it is apparent that radial holes 30 of the second outlet channel connect with the same chamber 25 as the first outlet channel 29. This has the advantage that any possible fluid flow between the two outlet channels 29 and 31 is not impeded by the orifice in the piston 23.

In order not to impede the fluid flow from the inlet channel 28 to the first outlet channel 29 unnecessarily, it is advantageous in the dimensioning of the valve 14 to strive to make section 27 of the through-channel 26 large. Although a limited orifice effect is achieved thereby, but by at the same time making the spring 32 weak, that is to say easily compressible, the piston 23 will still move quickly to the position in which the holes 30 are covered over by the piston 23 and the second outlet channel 31 is closed off.

The piston 23 has in fact two positions, the position shown in FIG. 2 if there is no flow from the supply channel 28 to the first outlet channel 29, and the position in which the piston 23 covers the holes 30 if there is a flow from inlet channel 28 to first outlet channel 29.

I claim:

1. A hydraulic operating device, for the operation of a selector fork of a gearbox, comprising a double-acting cylinder, a pump, and a reservoir for hydraulic fluid, characterized in that the pump is a pump (2) with reversible pumping direction having two ports (4,5), which depending on the pumping direction serve as suction port or pressure port, each of the ports (4,5) being, on the one hand, connected to the reservoir (3) via a reservoir line (6,7), in which a non-return valve (8), closing in the direction of the reservoir (3), is mounted, and on the other hand, to a working chamber (11,12) of the double-acting cylinder (1) via a supply line (9,10), a fluid-flow controlled valve (14,15) being mounted in each of the supply lines, which valve comprises a body (21), a bore (22) formed in the body, a piston (23) which fits and can slide to various positions inside the bore and which divides the bore into two chambers (24,25), a through-channel (26,27) formed in the piston and designed as flow orifice connecting the two chambers (24,25), an inlet channel (28) formed in the body, which connects the port (4) of the pump (2) to one (24) of the chambers of the bore and via the through-channel in each position of the piston is connected to a first outlet channel (29) formed in the body (21), which connects the other chamber (25) of the bore to the working chamber (11) of the double-acting cylinder (1), a second outlet channel (30) formed in the body, which connects with one of the two chambers of the bore and can be closed with respect to the bore by the piston, and a return spring (32) positioned between the body and the piston, such that in the presence of fluid flow through the through-channel from the inlet channel side to the first outlet channel side, the force generated by the flow orifice moves the piston against the resistance of the return spring and the piston as a result closes off the second outlet channel, and, in the absence of fluid flow from the inlet channel to the first outlet channel, the return spring returns the piston and the piston thereby opens the second outlet channel, the second outlet channels (31) of both valves (14,15) being connected together.

2. Hydraulic operating device in accordance with claim 1, characterized in that the second outlet channels are connected to the reservoir.

3. Gearbox comprising a selector fork and a hydraulic operating device in accordance with claim 1 for the operation of the selector fork.

\* \* \* \* \*